J. STENZ.
GEARING.
APPLICATION FILED FEB. 5, 1912.

1,026,184.

Patented May 14, 1912.

Witnesses:

Inventor
John Stenz
By his Attorney

UNITED STATES PATENT OFFICE.

JOHN STENZ, OF BROOKLYN, NEW YORK.

GEARING.

1,026,184.   Specification of Letters Patent.   Patented May 14, 1912.

Application filed February 5, 1912. Serial No. 675,491.

*To all whom it may concern:*

Be it known that I, JOHN STENZ, citizen of the United States of America, residing at Brooklyn, in the county of Kings and State of New York, have invented certain new and useful Improvements in Gearing, of which the following is a specification.

The present invention pertains to a gearing for the transmission of a reciprocatory movement, as for instance, for the operation of pumps or the like, and has for its object to provide a gearing of this character the efficiency whereof will be greatly increased, by avoiding crank motion whereby dead points are created.

Figure 1:
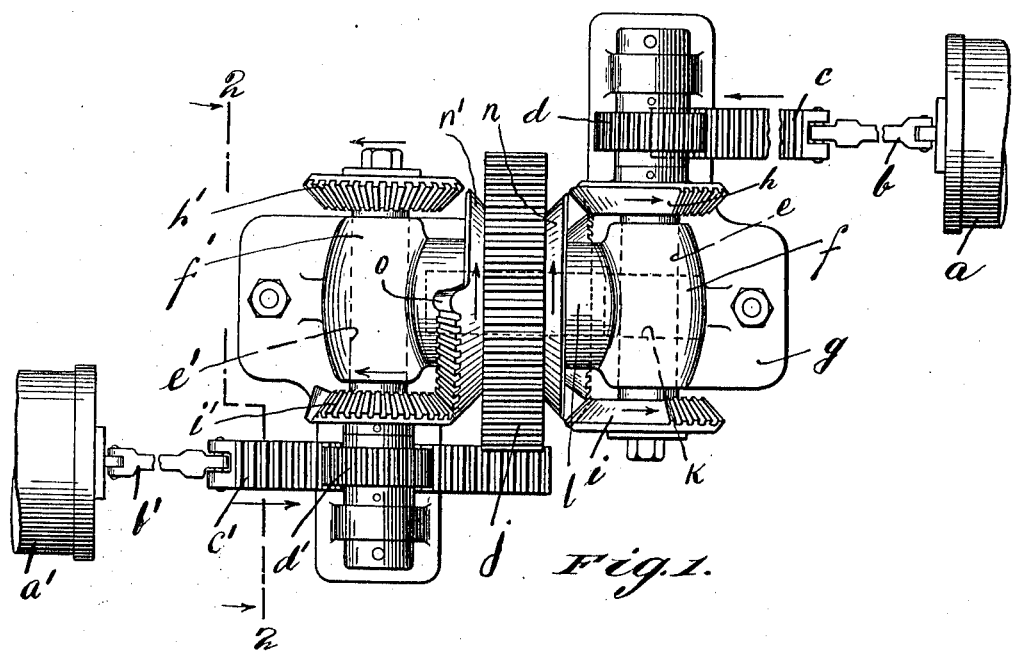
Figure 2:
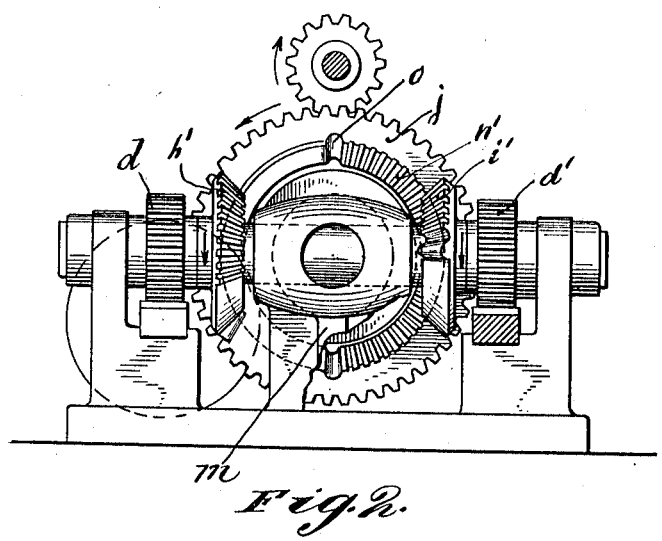

In the accompanying drawing which forms a part of this specification similar reference letters denote corresponding parts and Figure 1 is a top plan view and Fig. 2 a section on line 2—2 of Fig. 1 of the gearing.

In the present embodiment of my invention, I have shown the gearing in connection with a duplex pump. The two cylinders which are arranged at opposite ends are denoted by reference letters $a$ and $a'$. The piston rods $b$, $b'$ of the pistons reciprocating in the said cylinders are to this end provided with toothed extensions or racks $c$, $c'$ which are adapted to mesh respectively with gears $d$, $d'$. These gears are fixed on shafts $e$, $e'$ which are supported in bearings $f$, $f'$ provided in a bracket $g$. Fixed on each of the said shafts, are two partially toothed beveled wheels or sectors $h$, $i$, and $h'$, $i'$ respectively, which are adapted to revolve with the respective shafts, $e$, $e'$ in the same direction, as indicated by the arrows (Fig. 1).

Midway between the two sets of beveled gears a cog-wheel $j$ is provided which is fixed on a shaft $k$ in a cross bearing $l$. The latter is formed in the bracket $m$ which with those of the aforenamed bearings $f$, $f'$ may be cast of one piece. On the two faces of the said cog-wheel $j$, beveled sectors $n$, $n'$ are provided. These sectors $n$, $n'$ are displaced relative to one another at a certain angle, say 45°. One of the end teeth of each of the said sectors $n$, $n'$ may be somewhat increased in size with respect to the other teeth as indicated at $o$. These enlarged teeth have the object to insure prompt engagement of the respective sectors. Each of the said sectors $n$, $n'$ is adapted to alternately engage one set of the sectors $h$, $i$, and $h'$, $i'$ so that during the revolution of the wheel $j$, the pistons of the pump cylinders will receive reciprocatory motion and owing to the displacement of the sectors $n$, $n'$ relative to one another, the pistons will move in opposite directions, that is to say, while one piston executes its inward stroke, the other will execute its outward stroke, and vice versa. It will be easily understood that in like manner a four cylinder pump may be operated by such gearing. In that case there will be two cylinders on each side of the gearing, to the piston of which motion will be imparted through their toothed extensions by the driven beveled sectors $h$, $i$, and $h'$, $i'$.

Since various modifications may be made in the different parts of the construction without deviating from the spirit of my invention, I do not limit myself to the details shown and described.

What I claim and desire to secure by Letters Patent is:

In combination with oppositely arranged toothed members, gearing for imparting alternate reciprocating motion thereto, said gearing comprising a driving gear having toothed beveled sectors on its two faces, the said sectors being concentric to the said gear and displaced relative to one another at a certain angle, a shaft and a pair of beveled toothed sectors on the latter, on each side of said gear, the said last named sectors of each set being adapted to alternately come into meshing connection with the respective first named sectors and to transmit reciprocatory rotary motion to their respective shafts, and a gear on each shaft meshing with the said toothed members.

JOHN STENZ.

Witnesses:
MAX D. ORDMANN,
ELLIS V. LEVY.

---

Copies of this patent may be obtained for five cents each, by addressing the "Commissioner of Patents, Washington, D. C."